United States Patent
Kansal

(10) Patent No.: US 7,885,482 B2
(45) Date of Patent: Feb. 8, 2011

(54) COVERAGE-BASED IMAGE RELEVANCE RANKING

(75) Inventor: Aman Kansal, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1140 days.

(21) Appl. No.: 11/553,110

(22) Filed: Oct. 26, 2006

(65) Prior Publication Data

US 2008/0101723 A1    May 1, 2008

(51) Int. Cl.
*G06K 9/36* (2006.01)
(52) U.S. Cl. ........................ 382/284; 382/170
(58) Field of Classification Search ............... 382/284, 382/176
See application file for complete search history.

(56) References Cited

U.S. PATENT DOCUMENTS

| | | | |
|---|---|---|---|
| 5,579,471 A | | 11/1996 | Barber et al. |
| 6,163,622 A | * | 12/2000 | Abdel-Mottaleb et al. .. 382/170 |
| 6,504,571 B1 | | 1/2003 | Narayanaswami et al. |
| 7,099,860 B1 | | 8/2006 | Liu et al. |
| 2003/0130987 A1 | | 7/2003 | Edlund et al. |
| 2004/0101156 A1 | | 5/2004 | Kacker |
| 2005/0065929 A1 | | 3/2005 | Rui |
| 2005/0120311 A1 | | 6/2005 | Thrall |
| 2005/0223031 A1 | | 10/2005 | Zisserman et al. |
| 2006/0153456 A1 | | 7/2006 | Foote |
| 2006/0173918 A1 | | 8/2006 | Nakase et al. |

OTHER PUBLICATIONS

Chua, et al., "A Concept-Based Image Retrieval System", retrieved at <<http://ieeexplore.ieee.org/iel2/933/7711/00323321.pdf?isnumber=&arnumber=323321&htry=5>>, Proceedings of the Twenty-Seventh Annual Hawaii International Conference on System Sciences, 1994, IEEE, 1994, pp. 590-598.

Lin, et al., "Web Image Retrieval Re-Ranking with Relevance Model", retrieved at <<http://www.informedia.cs.cmu.edu/documents/wi03.pdf>>, IEEE/WIC International Conference on Web Intelligence (WIC'03), Halifax, Canada, Oct. 13-17, 2003, pp. 07.

Smith, et al., "VisualSEEk: a Fully Automated Content-Based Image Query System", retrieved at <<http://delivery.acm.org/10.1145/250000/244151/p87-smith.pdf?key1=244151&key2=1187697511&coll=portal&dl=ACM&CFID=11111111&CFTOKEN=2222222>>, ACM Multimedia 96, ACM, 1996, pp. 87-98.

* cited by examiner

*Primary Examiner*—Samir A Ahmed
*Assistant Examiner*—Ruiping Li
(74) *Attorney, Agent, or Firm*—Lee & Hayes, PLLC

(57) ABSTRACT

Implementations of coverage-based image relevance ranking are described. In one implementation, an acquired image is ranked relative to a set of previously stored images based upon the conditional entropy of the acquired image. The conditional entropy may be computed after first removing overlapping pixels that are present in both the acquired image and the set of previously stored images. Once the image is assigned a relevance rank, other decisions concerning the image may be made based on the rank, such as whether to save the image, delete the image, or use it to replace a less relevant image.

16 Claims, 7 Drawing Sheets

COVERAGE-BASED IMAGE RELEVANCE RANKING

BACKGROUND

A rapidly growing number of image capturing devices in the form of cameras, cellular phones, and portable digital assistants (PDAs) has led to a sizable increase in the number of digital pictures being taken and stored by users. However, the large number of available pictures has made it increasingly difficult for users and database service providers to organize and select the most useful pictures for downloading, uploading, displaying, storing, and submitting for further processing to other image processing algorithms. The problem is made more acute due to the costs incurred by the users in either downloading or uploading pictures and the expense borne by the database service providers for maintaining expansive databases. Accordingly, a need exists to improve selection and organization of digital images and thereby reduce the expenses of handing and managing such images.

SUMMARY

Techniques for coverage-based image relevance ranking are described. In one implementation, an acquired image is ranked relative to a set of previously stored images by computing conditional entropy of the acquired image. As part of this computation, overlapping pixels common to both the acquired image and the set of previously stored images may first be removed. In one scenario, the overlapping pixels are identified using key features found in both the image and the set of previously stored images. Overlap regions defined by the key features contain the overlapping pixels that are to be removed. Once the overlap regions of pixels are removed, the conditional entropy of the remaining portion of the acquired images is computed to ascertain the relevance rank of the acquired image relative to the other images. After the image is assigned a relevance rank, other decisions concerning the image may be made based on the rank, such as whether to save the image, delete the image, or use it to replace a less relevant image.

This Summary is provided to introduce a selection of concepts in a simplified form that are further described below in the Detailed Description. This Summary is not intended to identify essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for ranking an image based upon new spatial coverage provided by the image relative to existing coverage provided by a set of other images. The images may be captured in a number of ways via any number of different devices, such as cellular phones, digital cameras, portable digital assistants (PDAs), and so forth. The images may be stored on the devices themselves or in separate databases.

More particularly, the techniques generally involve calculating the conditional entropy of an image with respect to a set of other images in order to rank the image based on its spatial coverage. The conditional entropy computation involves determining a probability distribution of the image with respect to the other images. In one exemplary technique, the probability distribution of an image is determined after removing overlapping pixels common to both the image and the other images. The conditional entropy of the image is computed using this determined probability distribution and based upon the computed conditional entropy, the image is assigned a relevance rank or value.

Through these techniques, the relevance of an image in relation to previously captured and stored images can be ascertained. Image relevance may then be used to help organize and select the most useful pictures for storing, displaying, downloading, uploading, and submitting for further processing to other image processing algorithms. This in turn may help mitigate certain expenses incurred by users when downloading or uploading pictures and costs borne by database service providers when maintaining expansive database.

Multiple and varied implementations and embodiments are described below. In the following section, an exemplary environment that is suitable for practicing various implementations is discussed. After this discussion, representative implementations of systems, devices, and processes for implementing the coverage-based image relevance ranking are described.

Exemplary Environment

Figure 1:
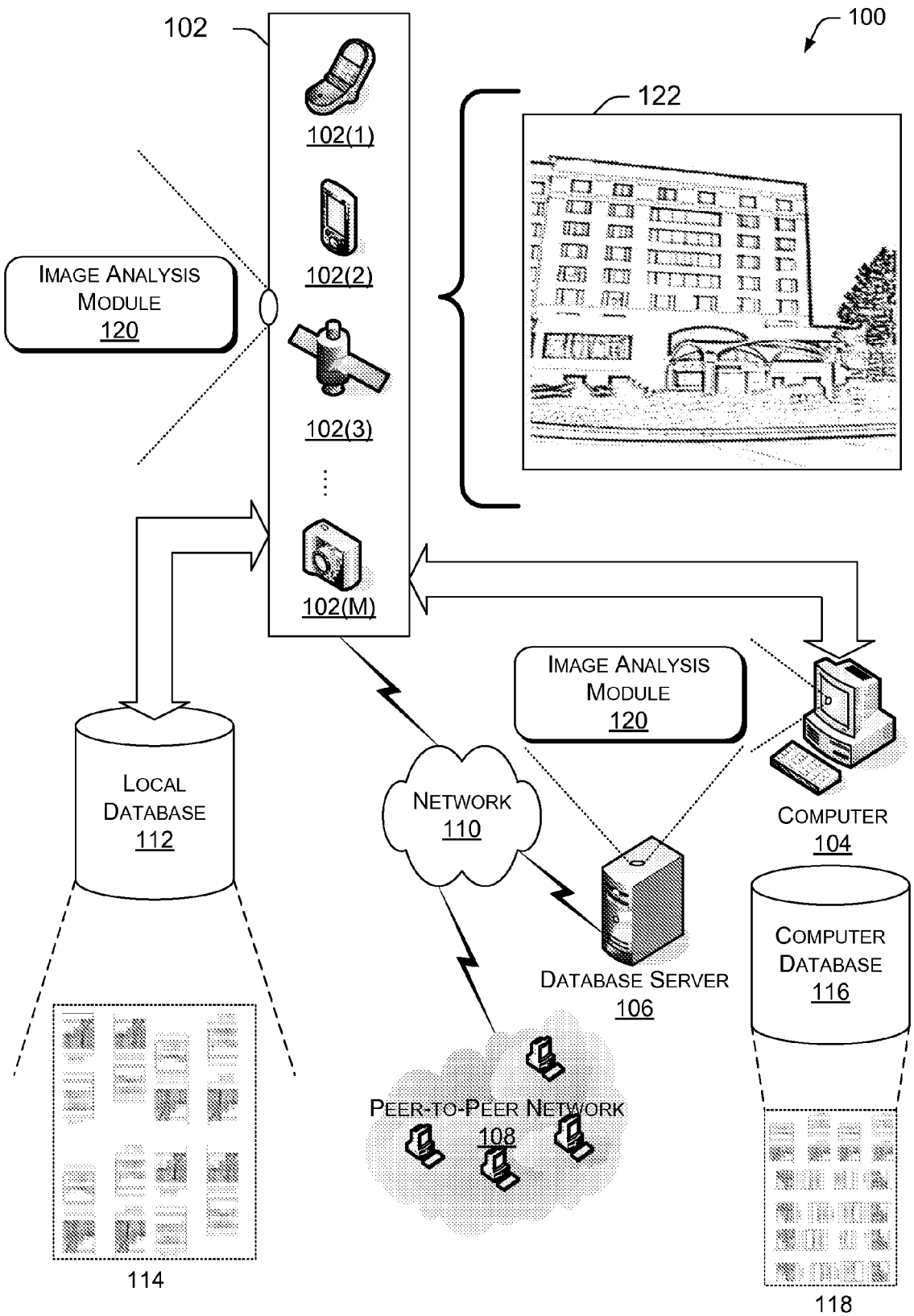
FIG. 1 illustrates an exemplary environment in which coverage-based image relevance ranking may be implemented.

FIG. 1 illustrates an exemplary environment 100 that is suitable for implementing coverage-based image relevance ranking. For discussion purposes, environment 100 includes at least one image acquisition device 102 that may be linked to one or more computers 104, to one or more database servers 106, or to one or more peer-to-peer networks 108 through a network 110.

The image acquisition device 102 may be implemented as any of a variety of devices capable of capturing digital images including, for example, a camera, a personal digital assistant (PDA), a satellite, a communication device such as a cellular phone, and so forth. In the exemplary environment 100, multiple image acquisition devices 102(1)-102(M) are illustrated including a cellular phone 102(1), a PDA 102(2), a satellite 102(3), and a digital camera 102(M). Each image acquisition device 102 may further include a local database 112, which may be implemented on a permanent memory (e.g., flash, hard drive, etc.), removable memory (e.g., memory card, etc.), or volatile memory (e.g., battery backed up random access memory). The local database 112 may contain a set of stored images 114 that were previously captured by the image acquisition device 102.

The network 110 may be a wireless network, a wired network, or a combination thereof. The network 110 can be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs), cellular networks, satellite networks, cable networks, and so forth.

The computer 104 is configured to receive and store digital images. The computer 104 may be implemented in any number of ways, including as a desktop personal computer (PC), a workstation, a portable computer (e.g., laptop, notebook, tablet, etc.) or other mobile computing device, an entertainment device (e.g., DVD player, a set top box, digital video recorder, etc.) and so on. The computer 104 may further include or have access to a computer database 116. The computer database 116 may contain a set of previously stored image 118.

The server computer 106 is configured to store and serve digital images. The server computer may be implemented in many ways, including as a one or more server computers (perhaps arranged in as a server farm), a mainframe computer, and so forth.

As shown in FIG. 1, any one of the image acquisition device 102, the computer 104, or the database server 106 may be equipped with an image analysis module 120 to implement coverage-based image relevance ranking of digital images. The module is said to be "coverage-based" to indicate a capability to analyze the spatial coverage of a scene recorded in a particular image. The image analysis module 120 ranks an image as a function of the area covered by that image with respect to the area covered by previously stored images. An image's relevance is then predicated on the usefulness of the image based on the coverage of that image. It is noted that other devices, such as peer-to-peer network devices 108, may also include an image analysis module 120 to rank selected or received images with respect to a set of previously stored images.

In one implementation, an image acquisition device 102 acquires an image 122. The image 122 consists of a set of pixels. Each pixel in the image displays a color, the value of which is dependent upon a bit-depth of the image. The image analysis module 120 compares the image 122 with previously captured and stored images, such as images 114 stored locally on the device, images 118 on computer database 116, or other image storage units. Based upon this comparison and analysis, the image analysis module 120 ranks the image 122 relative to the other images, as will be described below in more detail.

In another implementation, the image to be ranked may be acquired by selecting or retrieving an image from another device (such as a computer 104) or database (such as a database server 106). As represented by these alternative options, the image analysis module 120 need not reside on the device acquiring or storing the image, but may be accessed remotely by a device or database when an image needs to be ranked.

According to one technique, the image analysis module 120 computes the conditional entropy of the image 122 with respect to the selected set of previously stored images 114 or 118. In one approach, the computation is made after identifying and removing the overlapping pixels between the image 122 and the previously stored images 114 or 118.

Figure 2A:
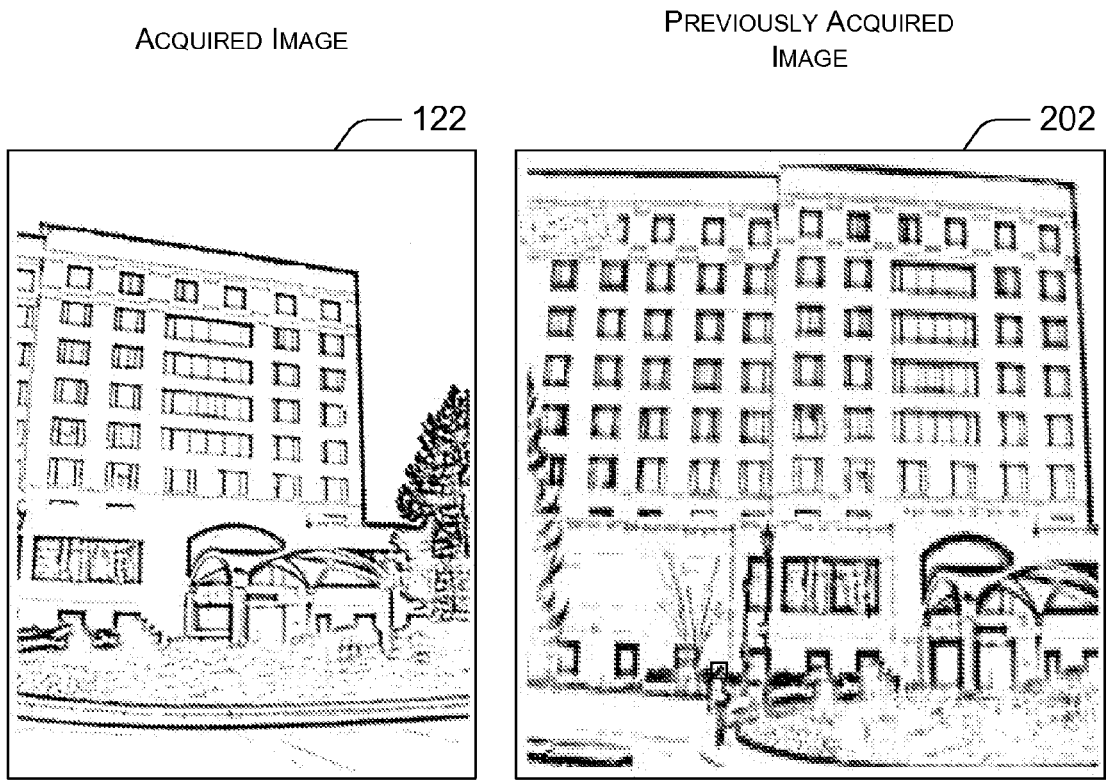
FIGS. 2a-2d are exemplary diagrams illustrating captured images and determination of overlapping pixels in the captured images.
Figure 2B:
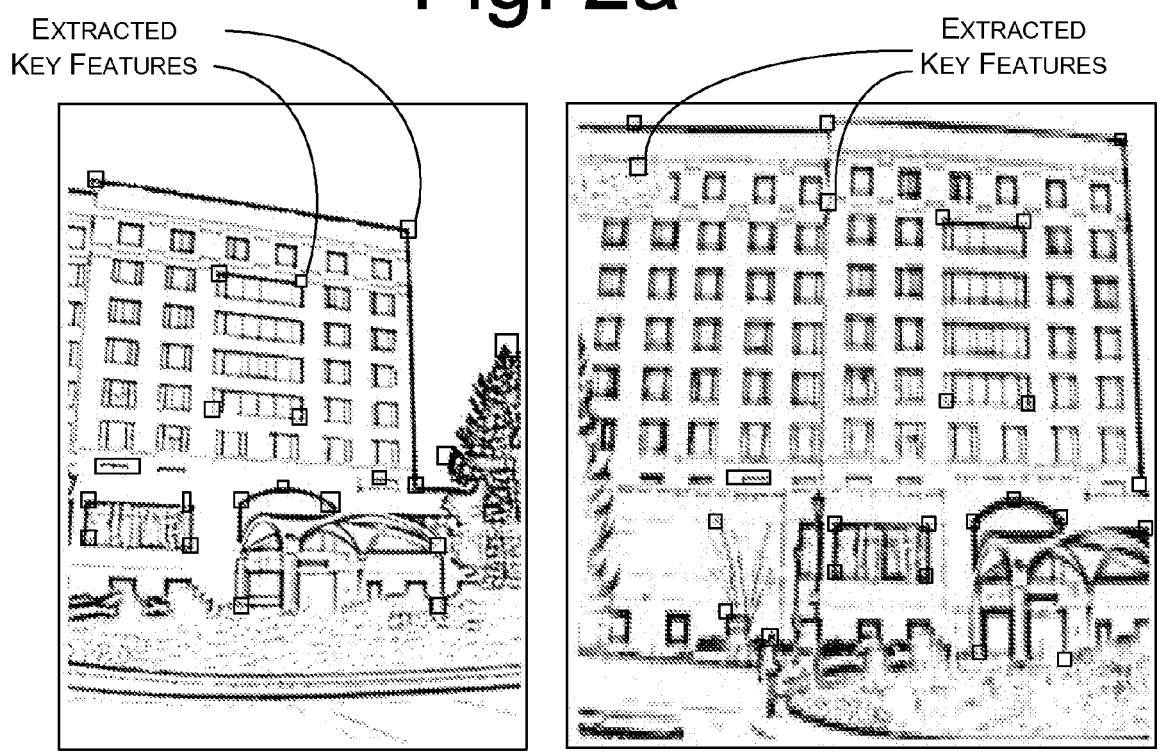

FIGS. 2a-2d show an example collection of images to explain how overlapping pixels are identified and removed. This collection of images shows a building facade, although any images may be used. In FIG. 2a, the acquired image 122 is shown alongside a previously stored image 202 from the set of images. The two images capture the picture of the same building, albeit slightly different areas. To determine any potential overlapping pixels in the image 122, the image analysis module 120 employs a key feature extraction technique to identify key features in both the image 122 and the previously stored image 202. The key features of an image might be identified as certain peculiar patterns or marks found on the image that are found using techniques based on key feature extraction algorithms. Key features tend to include certain features of an image such as corners of objects, or peculiar textures in the scene that seem to vary very little when considered from different angles or varying light levels. The methods to extract key features are well known in the art and such methods employed by the image analysis module 120 are known to persons skilled in the art. The extracted key features are shown in FIG. 2b to include the corners of the building, key window structures, entry arches, and the like. The key features are represented by rectangular marks overlaid on the images. It is noted that once key features of an image are extracted, they may be stored for later use. Thus, the key features used in the analysis may have been extracted previously and stored. In such cases, the image analysis module 120 retrieves these previously extracted key features rather than re-computing them each time.

Figure 2C:
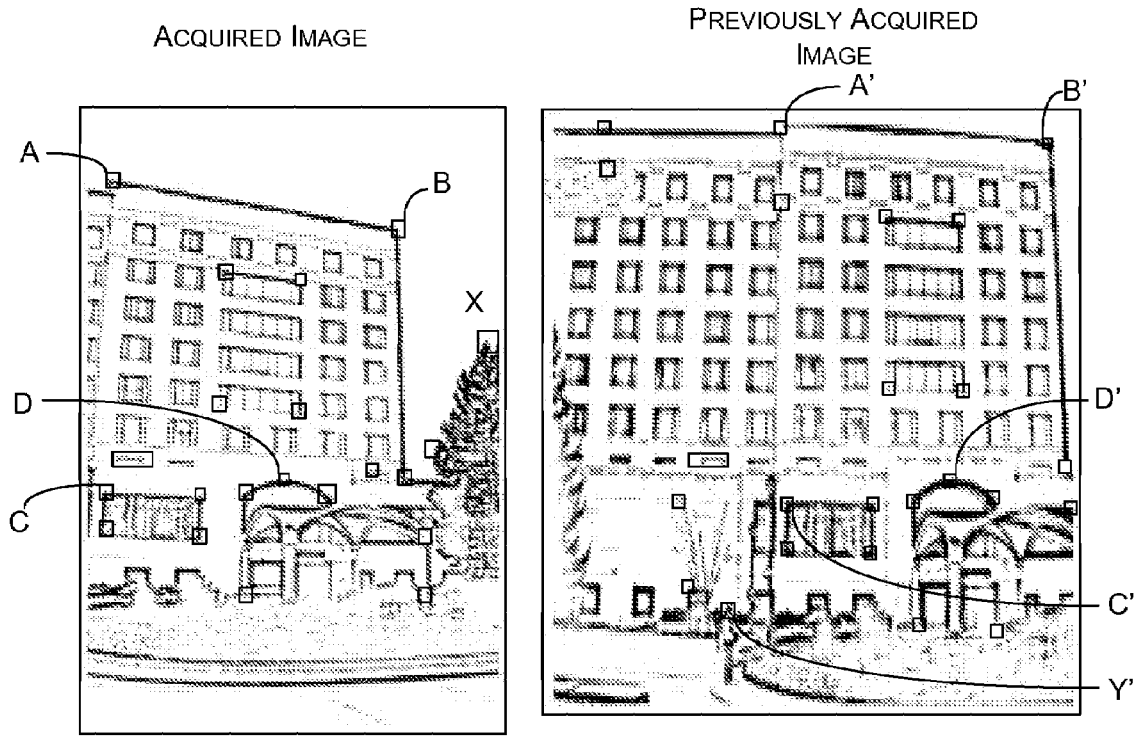

After extracting the key features from the image 122, the image analysis module 120 matches the key features between the two images. FIG. 2c illustrates an example of matched key features between two images. For example, the key features A and A', B and B', C and C', and D and D' are found to be matching between the images 122 and 202. However, the key feature X in image 122 does not match with any corresponding key feature in the previously stored image 202. Following the identification of the matched key features, the image analysis module 120 constructs a region between these matched key features within image 122. This region between the matched key features is referred to as the overlap region.

Figure 2D:
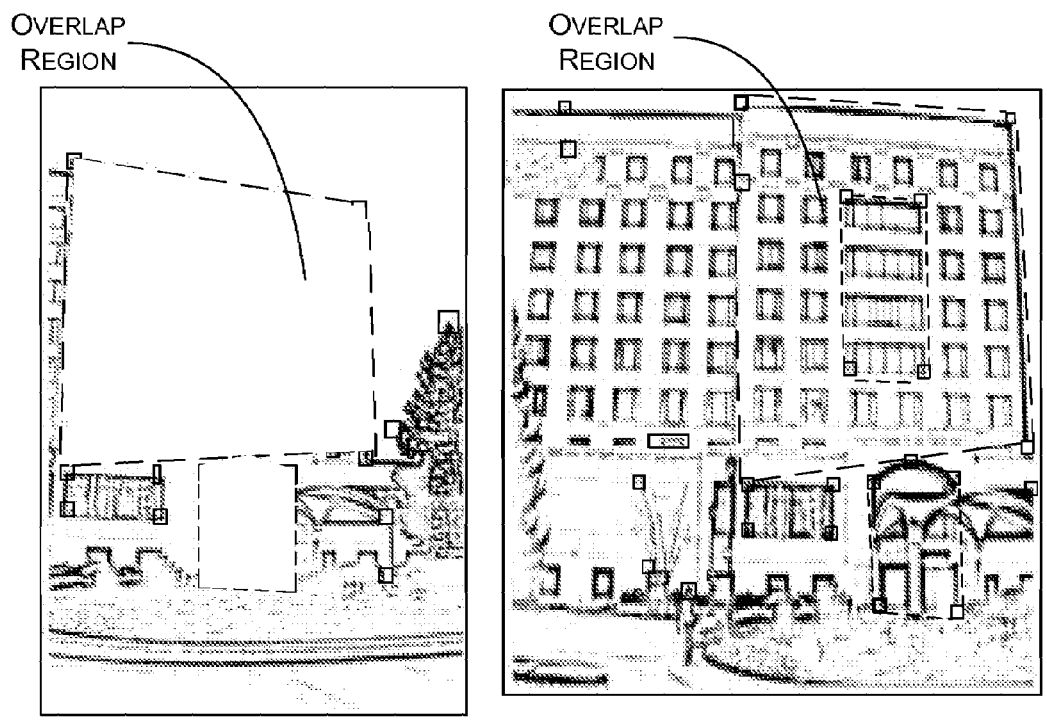

FIG. 2d shows an example of an overlap region. Here, the region bounded by key features A, B, C and D in image 122 is the overlap region and the corresponding overlap region in image 202 is the region bounded by corresponding key features A', B', C' and D'. The pixels contained within the overlap regions found within the image 122 are called overlapping pixels. The image analysis module 120 removes these overlapping pixels from the image 122 before computing the conditional entropy of the image 122. Similarly, overlap regions are identified for the image 122 with respect to every image within a set of previously stored images (such as stored images 114, 118) and the respective overlapping pixels are removed by the image analysis module 120.

The image analysis module 120 may additionally compute the union of all the overlap regions found within the image 122 with respect to all the images within a set of previously stored images. The pixels found within the union of overlap regions denote the union of all overlapping pixels between the image 122 and all the images in a set of previously stored images (such as stored images 114, 118). These overlapping pixels are removed from the image 122 before computing the conditional entropy of the image 122 with respect the set of previously stored images.

Once the image analysis module 120 computes a relevance ranking, the computing device may make any number of decisions based on this ranking. For instance, the device may determine whether to save the image or delete the image. This is particularly useful for image acquisition devices with limited memory resources, such as cellular phones or PDAs. Thus, if the acquired image has a higher relevance ranking than a certain threshold, it would be retained; otherwise, the image would not be saved. Alternatively, the acquired image with a comparatively higher relevance ranking may replace a previously acquired image with a comparatively lower relevance ranking. There are many other decisions or functions that may be performed once the relevance ranking is computed, and these are but examples for discussion purposes.

Exemplary System

Figure 3:
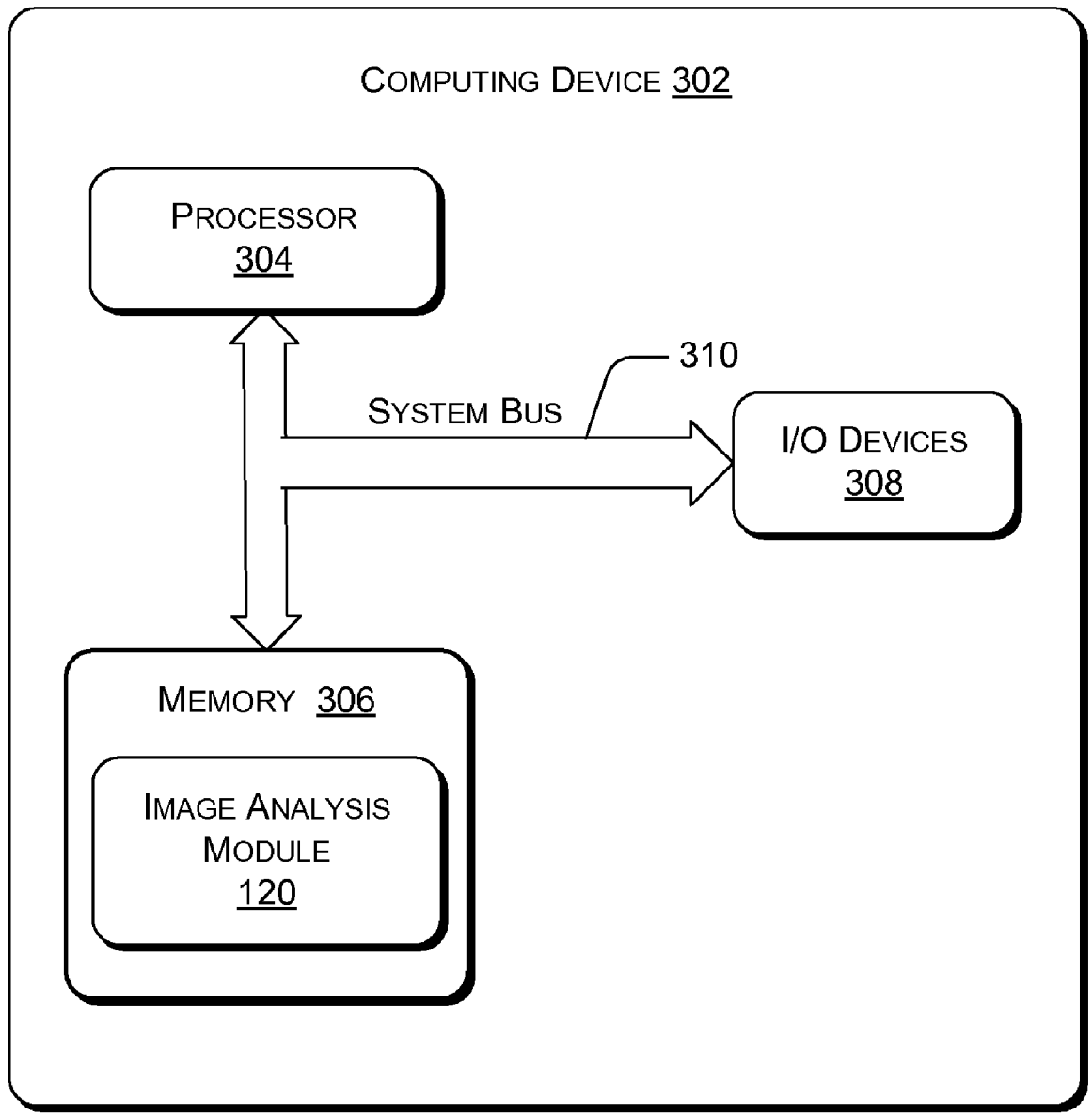
FIG. 3 is a block diagram illustrating an exemplary computing device for implementing coverage-based image relevance ranking.

FIG. 3 illustrates various components of an exemplary computing device 302 suitable for implementing coverage-based image relevance ranking. The computing device 302 is representative of any one of the devices shown in FIG. 1, including image acquisition devices 102, computer 104, and server 106. The computing device 302 can include, but is not limited to, a processor 304, a memory 306, Input/Output (I/O) devices 308 (e.g., keyboard and mouse), and a system bus 310 that operatively couples various components including processor 304 to memory 306.

System bus 310 represents any of the several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394 (i.e., FireWire) bus.

Memory 306 includes computer-readable media in the form of volatile memory, such as Random Access Memory (RAM) and/or non-volatile memory, such as Read Only Memory (ROM) or flash RAM. Memory 306 typically includes data and/or program modules for implementing coverage based image relevance ranking that are immediately accessible to and/or presently operated on by processor 304. In one embodiment, memory 306 includes the image analysis module 120, which may be implemented as computer software or firmware composed of computer-executable instructions that may be executed on the processor 304.

Though FIG. 3 shows the image analysis module 120 as residing on the computing device 302, it will be understood that the image analysis module 120 need not be hosted on the computing device 302. For example, the image analysis module 120 could also be hosted on a storage medium communicatively coupled to the computing device 302. This includes the possibility of the image analysis module 120 being hosted in whole, or in part, on the computing device 302.

Generally, program modules executed on the components of computing device 302 include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise computer storage media that includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which can be used to store the desired information and which can be accessed by a computer.

Figure 4:
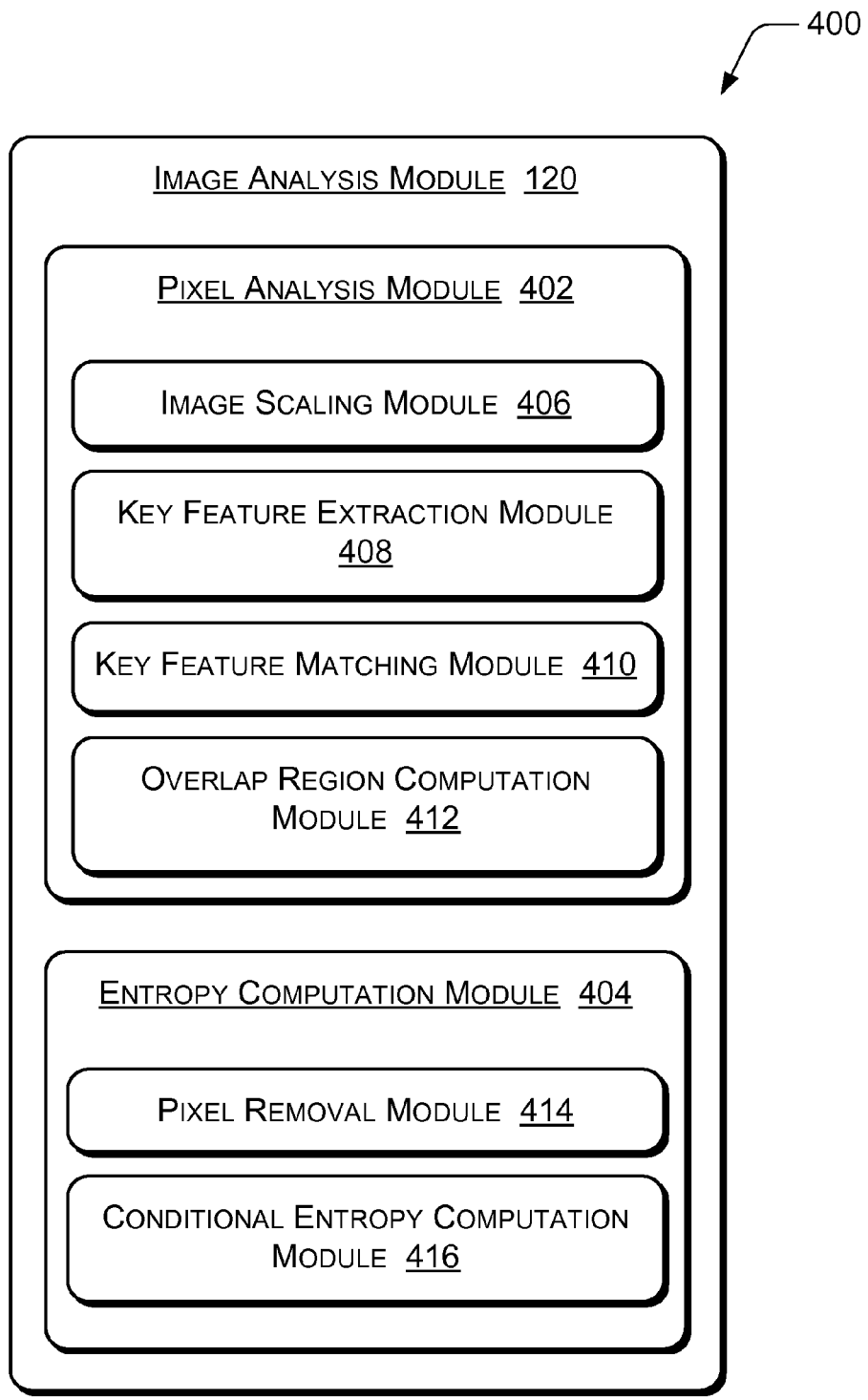
FIG. 4 is a block diagram illustrating one exemplary module for computing the coverage-based image relevance ranking.

FIG. 4 shows an exemplary implementation of the image analysis module 120. The image analysis module 120 includes a pixel analysis module 402 and an entropy computation module 404. The pixel analysis module 402 identifies any potential overlapping pixels between an image to be ranked (say image 122) and a set of previously stored images (such as stored images 114, 118). The pixel analysis module 402 may further include an image scaling module 406, a key feature extraction module 408, a key feature matching module 410, and an overlap region computation module 412. The following example is provided to illustrate how overlapping pixels are identified or otherwise determined by the pixel analysis module 402. In this example, the pixel analysis module 402 receives the image 122 that is to be ranked with respect to a set of previously stored images, say 114. First, the image scaling module 406 in the pixel analysis module 402 scales the image 122 to a standard size. The standard size may correspond to a chosen bit depth for an image. The image scaling module 406 may not scale the image in certain cases, such as where the image is smaller than the chosen standard size or where the processing capabilities do not support such scaling.

The key feature extraction module 408 then processes the images 122 and 114 to extract key features present. As discussed earlier, the key features are extracted using techniques and algorithms known previously in the art. Further, the key features in stored image 114 may have been previously extracted using, and hence this effort need not be duplicated. Following the identification of the key features of the image 122 and the set of previously stored images 114, the key feature matching module 410 detects matching key features present in both the image 122 and each of the images in the set of previously stored images 114. The overlap region computation module 412 selects respective matched key features within the image 122 and constructs a region bounded by the matched key features within the image 122. This constructed region within each image is the overlap region and the pixels within the region are the overlapping pixels. The overlap region computation module 412 similarly constructs overlap regions within the image 122 with respect to every image within the set of previously stored images 114.

Following this pixel analysis to ascertain the overlap regions, the entropy computation module 404 then determines the rank of an image as a function of the conditional entropy of the image 122. The entropy computation module 404 includes a pixel removal module 414 and a conditional entropy computation module 416. The pixel removal module 414 removes the overlapping pixels present within the image 122. The conditional entropy computation module 416 calculates the conditional entropy of the image 122 with respect to the previously stored images on the basis of the remaining pixels in the image 122.

In one implementation, the key feature matching module 410 discards matched key features that are spurious. One example of determining spurious matched key features is as follows. The key feature matching module 410 calculates the distances between matched key features in the image 122 and an image from the set of previously stored images 114. A threshold distance is computed based upon the set of computed distances between the matched key features. The matched key features having distances greater than the threshold distance are discarded as spurious matches. Similarly, spurious matched key features are determined with respect to each of the images within the set of previously stored images 114 and discarded.

In another implementation, the pixel removal module 414 computes the union of overlap regions within the image 122. The computed union of overlap region contains the overlapping pixels between the image 122 and all the images within a set of previously stored images 114. The pixel removal module 414 then removes the overlapping pixels within the image 122.

As noted above, the image analysis module 120 computes the ranking of an image based on the conditional entropy of the image with respect to a set of previously stored images. In one implementation, the conditional entropy is based upon entropy or Shannon Information of each selected image. In information theory, entropy of a variable X is defined as:

$$H(X) = -E[\log p(x_1)]$$

where $H(X)$ is the entropy of the variable X, $p(x_i)$ is the probability distribution of the variable X where X can take values between $x_1$ to $x_n$.

Similarly, entropy of an image can also be computed. An image can be represented by a vector having N elements, where N is the number of pixels in an image. If an image as a width, W, and a height, H, then the number of pixels, N, is given as:

$$N = W*H$$

In the above vector having N elements, each element corresponds to the value of a pixel in the image. Thus, an image having N pixels can be represented as:

$$V(X) = V(x_1, x_2 \ldots x_N)$$

where $V(X)$ denotes an image as vector $V(X)$ and $x_1, x_2 \ldots x_N$ represent the elements corresponding to pixels within the image.

Each element of vector $V(X)$ can take one value among a set of possible pixel values. The set of possible pixel values depends upon the image depth. For an RGB image, the image depth is typically 24 bits. Thus, for a 24 bit depth image, each pixel in the image can take a value between 1 and $2^{24}$. However, the bit depth of the image need not conform to a 24 bit depth, but may be any depth.

Suppose a given image having N pixels has values $a_1, a_2 \ldots a_N$ for its elements corresponding to pixels within the image, then the probability of vector $V(X)$ taking the above corresponding values for each pixel is given as:

$$P(V(X) = \text{given image}) = P(x_1 = a_1, x_2 = a_2 \ldots x_N = a_N)$$

where $P(x_1 = a_1, x_2 = a_2 \ldots x_N = a_N)$ is the probability that each element of $V(X)$ corresponds to the elements of the given image.

The computation of probability of each image induces a probability distribution over a set of possible images. Thus, using this probability distribution, entropy of an image can be provided as follows:

$$H(V(X)) = -E[\log P(V(X))]$$

where $H(V(X))$ is the entropy of an image represented by vector $V(X)$, and $P(V(X))$ is the probability distribution of vector $V(X)$.

Suppose a previously stored image can similarly be defined by a vector $V(Y)$, such that:

$$V(Y) = V(y_1, y_2, \ldots y_N)$$

Then, the conditional entropy of an image represented as $V(X)$ with respect to the previously stored image is provided as:

$$H(V(X)/V(Y)) = -E[\log P(V(X)/V(Y))]$$

Similarly, the conditional entropy of the image represented as $V(X)$ can be computed with respect to a set of previously stored images. Suppose the number of previously stored images is M, then the previously stored images can be represented as vectors $V(Y_1)$ to $V(Y_M)$. The conditional entropy of the image represented by Vector $V(X)$ with respect to the set of previously stored image can be provided as:

$$H(V(X)/V(Y_1) \ldots V(Y_M)) = -E[\log P(V(X)/V(Y_1) \ldots V(Y_M))] \quad (1)$$

where $P(V(X)/V(Y_1) \ldots V(Y_M))$ is the probability distribution of image $V(X)$ with respect to images $V(Y_1)$ to $V(Y_M)$.

In one implementation, the conditional entropy computation module 416 calculates the conditional entropy of an image with respect to a set of previously stored images by computing equation (1). The conditional entropy computation module 416 computes the probability distribution of the image by computing the probability distribution of the image with respect to a set of previously store images. One method of determining the conditional entropy of the image with respect to a set of previously stored image involves computing the probability distribution of the image after removing overlapping pixels from the image.

An example to compute the conditional entropy of an image having overlapping pixels is provided below. Suppose some of the pixels of the image represented by $V(X)$ have already been captured by a known image represented by $V(Y)$. Overlapping pixels are pixels within the image to be ranked (say image $V(X)$) that correspond to areas previously captured by a set of previously stored images. An example of overlapping pixels within overlap regions between two images is shown in FIG. 2d. Suppose, K number of pixels of vector X are found to be overlapping pixels, then the image represented by $V(X)$ can be reordered in the following manner:

$$V(X) = V(x_1, x_2 \ldots x_{(N-K)}, x_{(N-K+1)} \ldots x_N)$$

such that set $\{x_1, x_2 \ldots x_{(N-K)}\}$ represents the non-overlapping set of pixels within the image represented by $V(X)$. By computing the probability that each pixel in the non-overlapping overlapping set $\{x_1, x_2 \ldots x_{(N-K)}\}$ takes a value among all possible pixel values the conditional probability distribution of the input image of vector X with respect to the previously known image represented by $V(Y)$ is obtained. This conditional probability distribution can be used to determine the conditional entropy of the image represented by $V(X)$ with respect to the previously known image represented by $V(Y)$.

Similarly, conditional entropy of the image represented by $V(X)$ can be computed with respect to a set of previously known images. Suppose the number of previously known images is M and these images can be represented by vectors $V(Y_1), V(Y_2) \ldots V(Y_M)$. Further, if the overlapping pixels between the image represented by $V(X)$ and $V(Y_i)$ can be represented as $V(Z_i)$ having $K_i$ elements, then the union of $V(Z_1), V(Z_2) \ldots V(Z_M)$ represents the union of overlapping pixels, say $V(Z)$ found in the image represented by $V(X)$. The image represented by $V(X)$ can be trimmed by union of overlapping pixels $V(Z)$ for computing the conditional probability distribution of the image. This computed conditional probability distribution is used by the conditional entropy computation module 416 to determine the conditional entropy of the image.

Exemplary Processes

Figure 5:
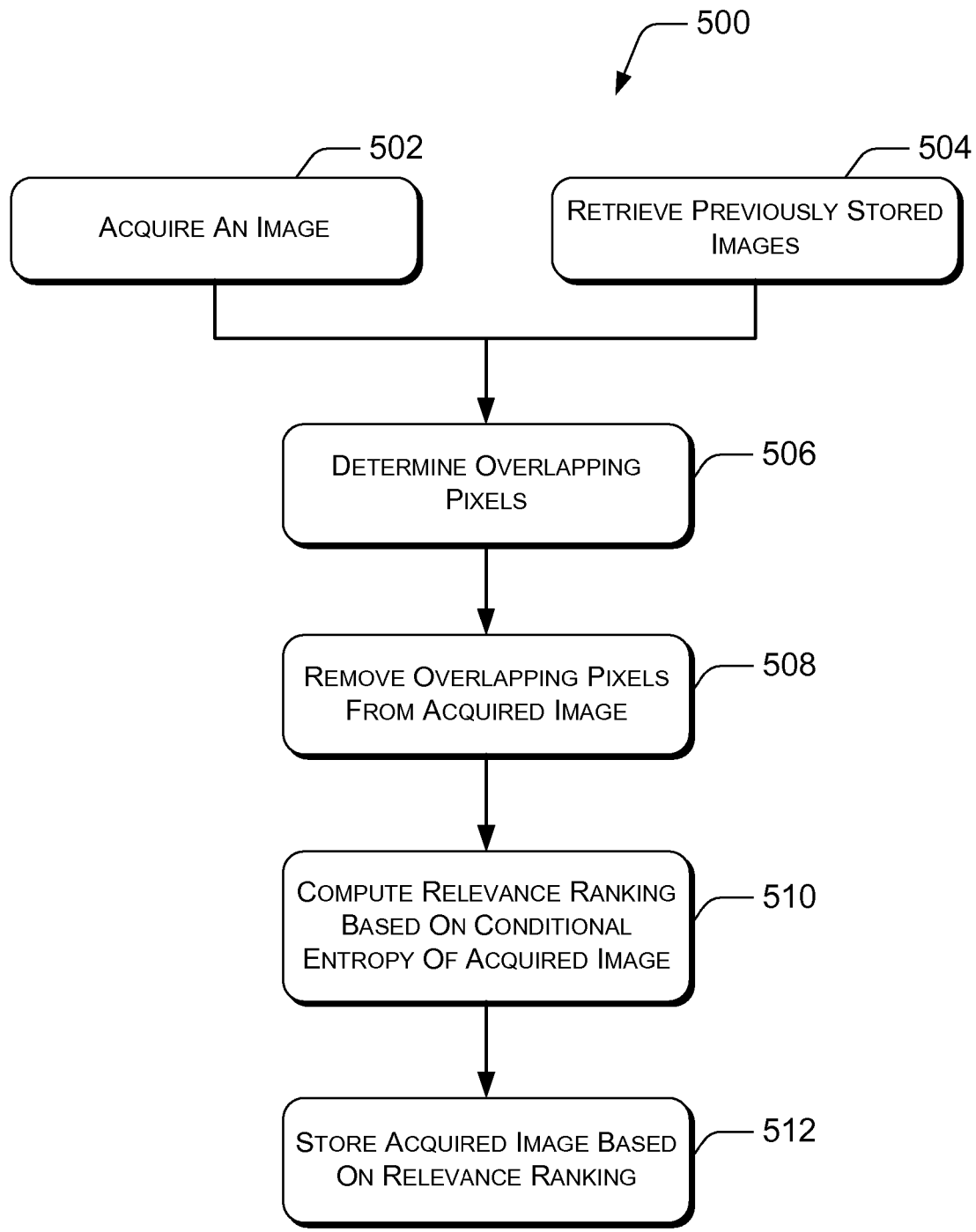
FIG. 5 is a flow diagram illustrating an exemplary process for coverage-based image relevance ranking.

FIG. 5 illustrates an exemplary process 500 for implementing coverage-based image relevance ranking. The process 500 (as well as other processes described below) is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 500 (as well as other processes described below) is described with reference to environment 100 shown in FIG. 1 and computing device 302 shown in FIG. 2. It will be apparent to a person ordinarily skilled in the art that environment 100, computing device 302 are described for exemplary purposes and the process 500 (as well as other processes described below) may be implemented in other environments, systems or network architectures to comply with other optimization policies.

Generally, the process 500 computes a relevance ranking of an acquired image based on the conditional entropy of the acquired image with respect to a set of previously stored images. At block 502, an image is acquired. This may be accomplished, for example, by one of the image acquisition devices 102 capturing a new digital image. Alternatively, the image may be acquired by selecting a previously stored image from the local database 112, the computer database 116, peer-to-peer network 108, or database server 106. The acquired image 122 is the image to be ranked using coverage-based image relevance ranking.

At block 504, a set of previously stored images is selected. The set of previously stored image may include, for example, the images 114 stored on local database 112, or stored images 118 stored on computer database 116. For the purposes of continuing discussion, it may be assumed that the set of previously stored images 114 is retrieved.

At block 506, overlapping pixels between the acquired image and the set of previously stored images are determined. This act may be performed, for example, by the image analysis module 120, or more particularly the pixel analysis module 402. One particular technique for identifying overlapping pixels is described above with reference to FIG. 4.

At block 508, the identified overlapping pixels are removed from the acquired image. This operation may be performed, for example, by the image analysis module 120, or more particularly, the pixel removal module 414 of the entropy computation module 404.

At block 510, a relevance ranking of the image is computed based on conditional entropy of the acquired image. In one implementation, this may be accomplished by the image analysis module 120 first determining the conditional probability distribution of the acquired image 122 after the overlapping pixels have been removed. Using the computed conditional probability distribution of image 122, the image analysis module 120 then calculates the conditional entropy of the image 122 with respect to the previously stored images 114. The image analysis module 120 further computes the relevance ranking of the image 122 as a function of the conditional entropy value of the image 122 with respect to the set of previously stored images.

At block 512, the image 122 ranked by the image analysis module 120 may be stored. The storing may be done automatically if the rank of the acquired image crosses a previously set threshold rank. Alternatively, the storing may be done at the discretion of the user after the user is notified of the image rank. Moreover, if the image is not ranked sufficiently high or the user decides not to save the image, the image may be canceled or deleted from memory.

Figure 6:
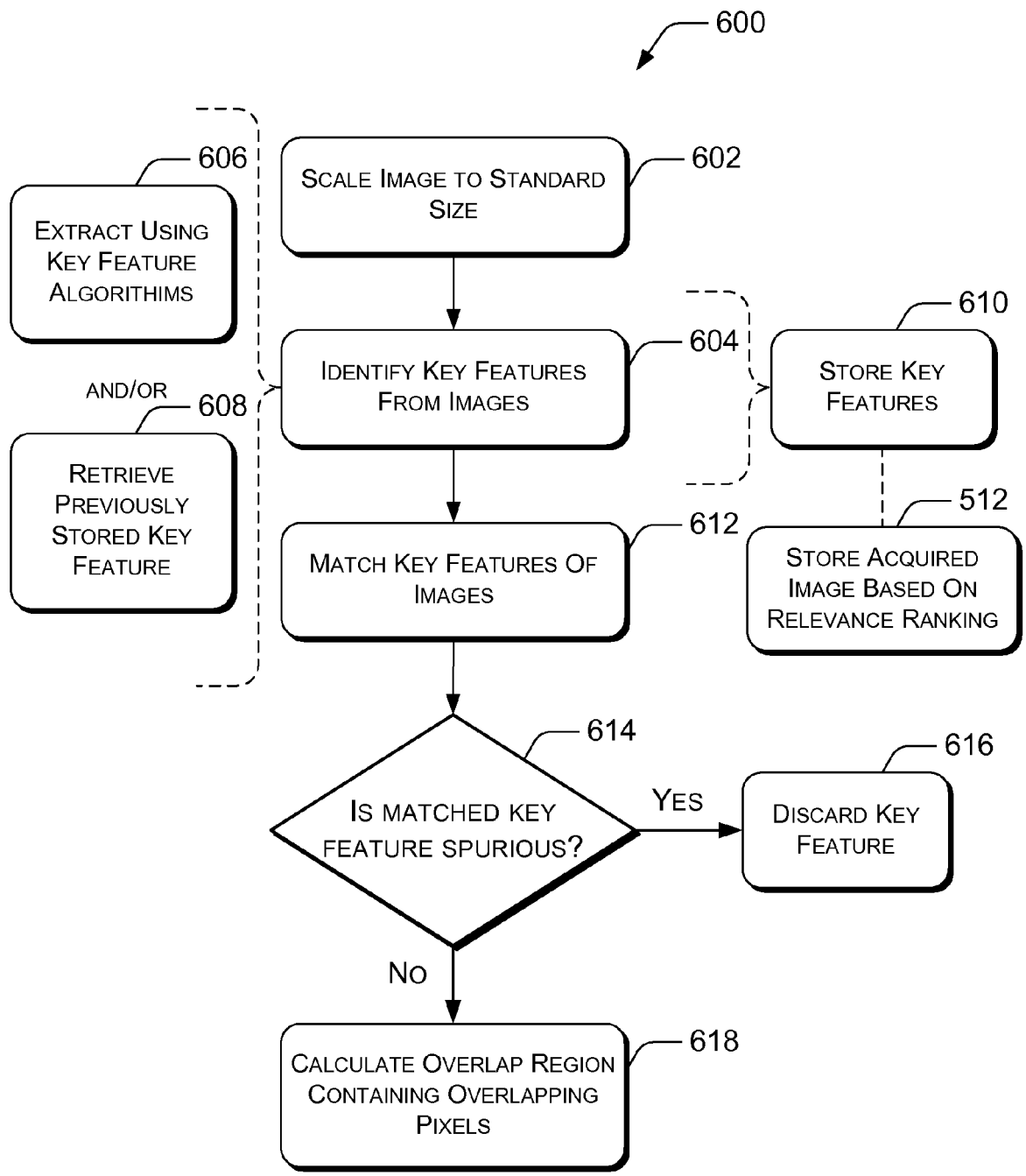
FIG. 6 is a flow diagram illustrating an exemplary process for determining overlapping pixels within an image.

FIG. 6 illustrates an exemplary process 600 for determining overlapping pixels within an image to be ranked. That is, process 600 is one possible implementation of the operation illustrated as block 506 in FIG. 5. The order in which the process is described is not intended to be construed as a limitation, and any number of the described blocks can be combined in any order to implement the method, or an alternate method. Additionally, individual blocks may be deleted from the process without departing from the spirit and scope of the subject matter described herein. Furthermore, the process can be implemented in any suitable hardware, software, firmware, or combination thereof.

At block 602, the acquired image may optionally be scaled to a standard or preset size. This operation may be performed, for example, by the image scaling module 406 in the image analysis module 120. The image scaling module 406 may use scaling methodologies that are well known in the art. The scaling is optional in that the image scaling module 406 may forego scaling of the image 122 if the image is already smaller than the chosen standard size. The image 122 may also be converted to grayscale to reduce the bit depth of each pixel to a standard bit depth. The selection of the standard bit depth may be based upon the processing capabilities of the computing device.

At block 604, key features of the image are identified. In one implementation, the key feature extraction module 408 identifies key features of the image 122 and the previously stored images 114. Key features are certain features of an image such as corners of objects, or peculiar textures in the scene that seem to vary very little when considered from different angles or varying light levels. Each key feature includes in its description a pixel in the image where the key feature is located. The key features may be identified in one or both of two different ways, which are represented by blocks 606 and 608. At block 606, the key features within an image may be identified by using key feature extraction techniques and algorithms known in the art. Alternatively, at block 608, key features within the image may be identified by retrieving previously stored key features. In certain situations, it may be necessary to use the combination of acts provided in block 606 and 608 to identify the key features within an image.

At block 610, the key features may be stored. For instance, the image analysis module 120 might work closely with the computing device 302 to store the key features. In certain situations, key features of the image 122 and the images within the set of previously stored images 114 are stored if such key features have not been previously stored. Further, storing the key features may be tied closely to storing the image based upon the relevance ranking (i.e., block 512 of FIG. 5). For example, the image analysis module 120 may facilitate the storing of such key features if the decision to store the acquired image is taken at block 512.

The identified key features are then matched at block 612. As one example, the key feature matching module 410 facilitates such matching of key features. In making the determination whether two key features match, a certain threshold of error is allowed to make the matching robust to slight variations in the key feature arising due to change in quality of image, perspective, light levels, etc.

At block 614, the matched key features are analyzed to determine whether any matches are spurious. For instance, the key feature matching module 410 identifies pairs of key features that match across two images. The vector difference of the pixel locations of the matched key feature in the input image and the corresponding matched key feature in the previously stored image for each matched pair is computed. Each difference vector consists of two elements, corresponding to the horizontal and vertical dimensions. Threshold distances are determined by the key feature matching module 410 for the horizontal and vertical components respectively. This determination is based upon the distance vectors for each pair of matched key features. All the matched key features for which the horizontal and vertical components of difference vectors lie within threshold distances are considered non-spurious matches and are retained. The remaining key features are rejected as spurious matches by the key feature matching module 410 at block 616 (i.e., the "Yes" branch from block 614).

For these key features not rejected as spurious (i.e., the "No" branch from block 614), an overlap region containing the overlapping pixels is calculated at block 618. As an example, the overlap region computation module 412 computes the region defined by the matched key features in the image 122. The overlap region computation module 412 locates the pixel corresponding to the key features in the two dimensional plane of the image 122. One example of the methods used by the overlap region computation module 412 to compute the overlap region is constructing a polygon surrounding the key features matched within the image 122, as illustrated above with respect to FIGS. 2a-2d. The pixels lying within the computed polygon are the overlapping pixels.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    acquiring an image having multiple pixels;
    determining overlapping pixels between the acquired image and a plurality of previously acquired images;
    computing a relevance ranking of the acquired image based on conditional entropy of the acquired image, with respect to an entropy contributed by the overlapping pixels and with respect to the plurality of previously acquired images; and
    replacing a previously stored image with the acquired image if the relevance ranking of the acquired image is higher than that of the previously stored image.

2. A method as recited in claim 1, wherein the acquiring an image is achieved by at least one of a camera, a satellite, a portable digital assistant, or a communication device.

3. A method as recited in claim 1, wherein the determining overlapping pixels comprises scaling the acquired image to a predetermined size.

4. A method as recited in claim 1, wherein the determining overlapping pixels comprises:
    identifying key features from the acquired image and from the plurality of previously acquired images;
    matching the key features identified from the acquired image with the key features identified from the plurality of previously acquired images; and
    calculating overlap regions defined by the key features that matched in the acquired image and the plurality of previously acquired images, wherein pixels contained within the overlap regions are the overlapping pixels.

5. A method as recited in claim 4, wherein the determining overlapping pixels further comprises eliminating the key features that are spurious.

6. A method as recited in claim 4, wherein the identifying comprises retrieving previously stored key features of the plurality of previously acquired images.

7. A method as recited in claim 4, further comprising:
    storing the key features of the plurality of previously acquired images if the key features were not previously stored; and
    storing the key features of the acquired image if the acquired image is stored.

8. A method as recited in claim 4, wherein the computing a relevance ranking comprises:
    computing a union of the overlap regions; and
    removing the overlapping pixels contained within the union of overlap regions from the acquired image.

9. A method as recited in claim 1 further comprising deciding whether to store the acquired image based on the relevance ranking.

10. A computer readable medium, where the medium is not a signal, storing computer-executable instructions that, when executed, configure one or more processors to perform acts comprising:
    receiving an image; and
    computing a relevance ranking for the image as a function of conditional entropy of the image with respect to an entropy contributed by a plurality of previously acquired images, wherein the computing a relevance ranking comprises:
    scaling the image to a predetermined size;
    identifying key features of the image and the plurality of previously acquired images;
    matching the key features found in both the image and the plurality of previously acquired images; and
    eliminating any matching key features of the image that are spurious.

11. A computer-readable medium as recited in claim 10, wherein the computing a relevance ranking comprises:
    identifying overlapping pixels found in both the image and the plurality of previously acquired images; and
    computing a relevance ranking for the image by:
        computing the conditional entropy of the image, with respect to the entropy contributed by the overlapping pixels and with respect to the plurality of previously acquired images.

12. A computer-readable medium as recited in claim 10, further comprising computer-executable instructions that, when executed by the processor, perform an additional act of deciding whether to store the image based on the relevance ranking of the image.

13. A communications device comprising:
    the computer-readable medium as recited in claim 10; and
    one or more processors to execute the computer-executable instructions stored on the computer-readable medium.

14. A device comprising:
    one or more processors;
    memory; and
    an image analysis module, stored in the memory and executable on the one or more processors, to compute a relevance ranking of an image based on conditional entropy of the image with respect to an entropy contributed by a plurality of previously acquired images, wherein the image analysis module comprises:
    a pixel analysis module to determine overlapping pixels common to both the image and the plurality of previously acquired images; and an entropy computation module to compute the conditional entropy of the image, wherein the entropy computation module comprises:
- a pixel removal module to remove the overlapping pixels from the image; and
- a conditional entropy computation module to calculate the conditional entropy of the image, after the pixel removal module has removed the overlapping pixels, with respect to the plurality of previously acquired images.

15. A device as recited in claim 14, wherein the pixel analysis module comprises:
- an image scaling module to scale the image to a predetermined size;
- a key feature extraction module to identify key features from the image and the plurality of previously acquired images;
- a key feature matching module to match the key features identified in the image with corresponding key features identified in the plurality of previously acquired image; and
- an overlap region determination module to determine overlap regions between the image and the plurality of previously acquired images, wherein the overlapping pixels are contained with the overlap regions.

16. A device as recited in claim 14, embodied as one of at least a communication device, a camera, a computer, a satellite, a peer-to-peer network.

* * * * *